US007672096B2

(12) United States Patent
Messersmith et al.

(10) Patent No.: US 7,672,096 B2
(45) Date of Patent: Mar. 2, 2010

(54) SWITCHING APPARATUS AND METHOD

(75) Inventors: David M. Messersmith, Kenosha, WI (US); Thomas A. Nondahl, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 614 days.

(21) Appl. No.: 11/537,207

(22) Filed: Sep. 29, 2006

(65) Prior Publication Data

US 2008/0094771 A1 Apr. 24, 2008

(51) Int. Cl.
*H02H 3/00* (2006.01)
*H02H 7/00* (2006.01)

(52) U.S. Cl. .......................................................... 361/8

(58) Field of Classification Search ..................... 361/8, 361/13

See application file for complete search history.

(56) References Cited

U.S. PATENT DOCUMENTS 4,142,136 A * 2/1979 Witter ........................ 318/779
4,622,513 A * 11/1986 Stich .......................... 323/343
4,864,157 A 9/1989 Dickey
5,361,184 A 11/1994 El-Sharkawi et al.
5,528,443 A * 6/1996 Itoga et al. ...................... 361/8
5,578,980 A * 11/1996 Okubo et al. ............... 335/132
5,627,415 A 5/1997 Charpentier et al.
5,808,851 A 9/1998 Birrell
6,650,245 B2 * 11/2003 Chung ........................ 340/648
2002/0012210 A1 * 1/2002 Morris et al. ................. 361/23
2002/0093774 A1 * 7/2002 Chung ........................... 361/2

OTHER PUBLICATIONS

W.S. Wood, F. Flynn, A. Shanmugasundaram, "Transient torques in induction motors, due to switching of the supply", Proceedings of the Institution of Electrical Engineers, vol. 112, No. 7. pp. 1348-1354, Jul. 1965.

Catalogue Publication 1HSM 9543 22-01en, Controlled Switching Buyer's Guide, Edition 1, May 2004. Print: Henningsons Tryckeri AB, Sweden.

* cited by examiner

*Primary Examiner*—Ronald W Leja
(74) *Attorney, Agent, or Firm*—Whyte Hirschboeck Dudek, S.C.; Alexander R. Kuszewski; John M. Miller

(57) ABSTRACT

An improved switching apparatus and method are disclosed. In at least some embodiments, the apparatus includes first and second ports, a first switching device such as a contactor coupled between the ports, and a second switching device coupled in parallel with the contactor between the ports, where the second switching device can be or include a solid-state semiconductor device. The second switching device is operated to become conductive at a first time prior to a second time when the contactor switches between a conductive state and a non-conductive state, and remains conductive up to a third time subsequent to the second time. In at least some further embodiments, the apparatus also includes one or both of a voltage sensing capability and a current sensing capability and switches the second switching device to become conductive based upon voltage and/or current information.

25 Claims, 7 Drawing Sheets

SWITCHING APPARATUS AND METHOD

CROSS-REFERENCE TO RELATED APPLICATIONS

--

STATEMENT REGARDING FEDERALLY SPONSORED RESEARCH OR DEVELOPMENT

--

FIELD OF THE INVENTION

The present invention relates to electrical switching devices and systems such as electromechanical contactors.

BACKGROUND OF THE INVENTION

Electrical switches such as electromechanical contactors are employed in a variety of circumstances and in relation to a variety of different types of electrical systems including, for example, single-phase and multi-phase (e.g., 3-phase) systems. In many circumstances, the contactors govern whether high levels of power are provided to loads that demand such high levels of power, for example, electrical motors. Also, in many circumstances, the closing/opening of the contactors determines in particular whether high levels of current are allowed to flow through the contactors to the loads.

Operation in such circumstances can expose the contactors to various undesirable stresses. For example, as the contactors are closed and opened, the contactors can experience arcing and related stresses resulting from changes in the current flow that, over time, can result in the contactors becoming welded or otherwise worn out. Further, operation in such circumstances can also place additional stress upon the loads with respect to which the delivery of power is being controlled by the contractors. For example, excessively rapid transitions in the levels of current being provided to the loads can be detrimental to long-term operation of the load devices.

For at least these reasons, therefore, it would be advantageous if an improved switching apparatus and/or related method could be developed for governing the delivery of power. In at least some embodiments, it would be advantageous if such an improved switching apparatus/method was capable of operating in a manner that reduced at least some stresses upon the switching apparatus itself. In at least some further embodiments, it would be advantageous if such an improved switching apparatus/method was capable of operating in a manner that reduced at least some stresses upon a load or other device in conjunction with which the apparatus was operating.

BRIEF SUMMARY OF THE INVENTION

The present inventors have recognized that it is possible to reduce the stresses placed upon a main electrical switching device such as a contactor in at least some embodiments by coupling, in parallel with the electrical switching device/contactor, an additional electrical switching device such as a solid-state semiconductor device. By closing the additional electrical switching device prior to the closing of the main electrical switching device, most or all stresses associated with the initiation of current flow that might be borne by the main electrical switching device in conventional embodiments instead are borne by the additional electrical switching device. Relatedly, by opening the additional electrical switching device subsequent to the opening of the main electrical switching device, most or all stresses associated with the cessation of current flow are borne by the additional electrical switching device rather than the main electrical switching device.

Further, the present inventors have recognized that it is possible to reduce the stresses placed upon a load (or other system/device) coupled to a main electrical switching device such as a contactor through the use of such an additional electrical switching device as well. More particularly, in at least some embodiments, the additional electrical switching device can be controlled so that it is closed and/or opened at times in which a small and balanced current is likely to initially flow and/or cease flowing through the overall device including the additional electrical switching device. In at least some such embodiments, control over the additional electrical switching device can be based upon voltage and/or current information sensed with respect to the overall device. As a result, in such embodiments, the load does not experience as sudden changes in current flow that it might otherwise experience in conventional embodiments.

More particularly, in at least some embodiments, the present invention relates to an apparatus that includes first and second ports, a contactor coupled between the ports, and a switching device coupled in parallel with the contactor between the ports. The switching device includes a solid-state semiconductor device, and the solid-state semiconductor device is operated to become conductive at a first time prior to a second time when the contactor switches between a conductive state and a non-conductive state, and remains conductive up to a third time subsequent to the second time.

Additionally, in at least some embodiments, the present invention relates to an apparatus that includes first and second ports, a main switching device coupled between the first and second ports, an additional switching device coupled in parallel with the main switching device, and a sensing device configured to sense an electrical quantity associated with the apparatus. The main switching device is operated to switch between a conductive state and a non-conductive state during a time period within which the additional switching device is conductive, and the additional switching device is operated to become conductive at a first time that is determined based at least in part upon the sensed electrical quantity.

Further, in at least some embodiments, the present invention relates to a method of switching an apparatus having first and second ports between a first state in which a conductive path exists between the first and second ports and a second state in which the conductive path does not exist between the first and second ports. The method includes (a) receiving a command signal that the apparatus be switched between the states, (b) switching a solid-state semiconductor device so that the solid-state semiconductor device is conductive, (c) switching a contactor between a conductive state and a non-conductive state, where the contactor is coupled in parallel with the solid-state semiconductor device between the ports, and (d) switching the solid-state semiconductor device so that the solid-state semiconductor device is no longer conductive, whereby a transitional current associated with the switching between the first and second states is borne largely by the solid-state semiconductor device rather than the contactor.

DETAILED DESCRIPTION OF THE INVENTION

Figure 1:
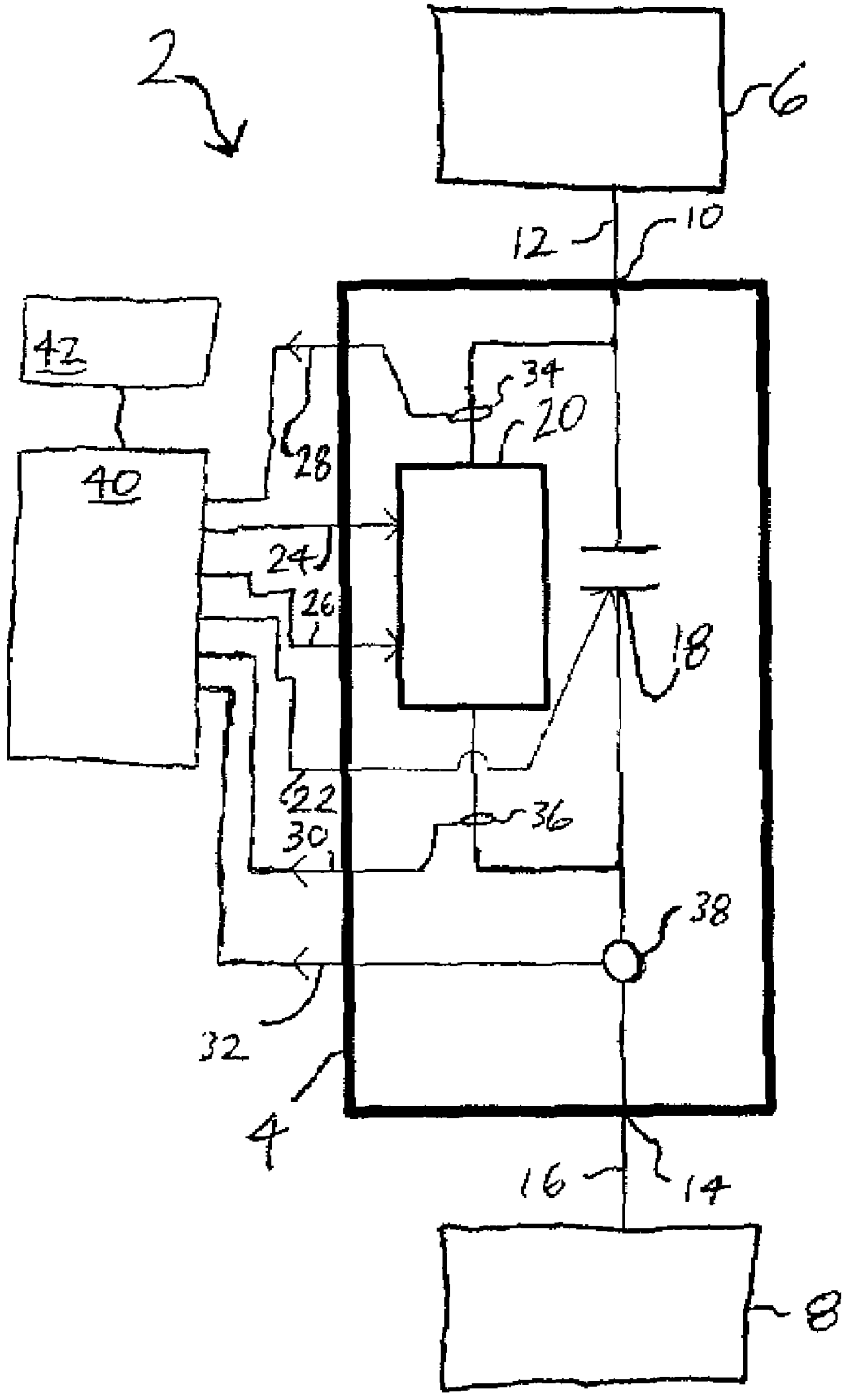
FIG. 1 shows in schematic form an exemplary system employing an exemplary improved switching apparatus having both a main switching device and an additional switching device, in accordance with at least some embodiments of the present invention.

Referring to FIG. 1, an exemplary system 2 is shown that, in accordance with at least some embodiments of the present invention, includes a switching apparatus 4 that governs whether power can be communicated between a first device 6 and a second device 8. More particularly, a first port 10 of the switching apparatus 4 is coupled to the first device 6 by way of a first link 12, and a second port 14 of the switching apparatus is coupled to the second device 8 by way of a second link 16. Depending upon the embodiment, the switching apparatus 4 can govern whether power is able to flow from the device 6 to the device 8, from the device 8 to the device 6, and/or in both directions, and likewise is capable of governing whether current flows from the first device 6 toward the second device 8, in the reverse direction, or in both directions.

In at least some embodiments of the present invention, the first device 6 is a power source while the second device 8 is a load (for example, a motor). However, in other embodiments, the second device 8 is a power source and the first device 6 is a load, or one or both of these devices can have attributes of both a source and a load (for example, as a motor/generator). Also, the devices 6, 8 can be understood to represent additional links such as power lines by which the links 12, 16 are coupled to other devices not shown. Indeed, the present system 2 is intended to be generally representative of a variety of systems having a switching apparatus that serves to couple two disparate systems or devices and governs whether power (and/or current) flows between those systems or devices. Further, it should be noted that, in at least some embodiments, the system 2 is intended to be a high power system. For example, the first device 6 could be representative of a high power transmission line and the second device could be representative of a high power load device.

As shown in FIG. 1, the switching apparatus 4 includes both a main or primary switching device 18 as well as an additional or secondary switching device 20, where the main and additional switching devices are coupled in parallel with one another between the first and second ports 10 and 14. In the present embodiment, the main switching device 18 is a contactor that can be controlled by actuation of a coil of the contactor. Actuation of the coil is determined by a contactor coil control signal 22. In at least some circumstances, the contactor is capable of conducting high levels of current and power. Also in the present embodiment, the additional switching device 20 includes a thyristor or a silicon controlled rectifier (SCR), actuation of which is determined by way of a SCR gate control signal 24 that is provided to the SCR. In other embodiments, the additional switching device 20 can include another transistor device, solid-state semiconductor protection device, or other switching device, rather than a SCR/thyristor. As will be described in further detail below, the additional switching device 20 is capable of operating as a bypass or secondary or alternate conduction path in addition to or instead of that provided by the main switching device 18.

In addition to the signals 22 and 24 used to control the operation of the main switching device 18 and the SCR of the additional switching device 20, in at least some embodiments, one or more other signals can be provided to or received from the switching apparatus 4. Among these other signals is an isolation contactor coil control signal 26 that in at least some embodiments (such as those discussed with respect to FIGS. 2 and 3 below) is provided to the additional switching device 20 to control the opening and closing of an isolation contactor coupled in series with the SCR of the additional switching device 20 between the ports 10 and 14.

Also in at least some embodiments (but not all embodiments), the switching apparatus 4 includes one or more of (and potentially each of) a first voltage sensing signal 28, a second voltage sensing signal 30 and a current sensing signal 32. The first voltage sensing signal 28 is representative of the voltage at the first port 10 and can be generated by way of a first voltage sensing device 34 present within the apparatus 4 that is capable of sensing the voltage at that node, or simply by way of a tap connected to that port/node. Similarly, the second voltage sensing signal 30 is representative of a second voltage existing at the second port 14 and can be obtained by way of a second voltage sensing device 36 that senses the voltage at that port/node as shown, or simply by way of a tap coupled to that port/node. As for the current sensing signal 32, that signal can be generated by way of a current sensing device 38 that senses the current flowing into or out of the switching apparatus 4 by way of the port 14, which should also be identical to the current flowing into or out of the switching apparatus at the port 10.

In the embodiment shown, it is presumed that the current sensing device 38 is ideal or nearly ideal, such that only a negligible (if any) voltage drop appears across it and such that it does not appreciably affect the voltages indicated on the voltage sensing signals 28, 30. Further, as mentioned above, each of the signals 26, 28, 30 and 32 is optional, as are each of the isolation contactor within the additional switching device 20, the voltage sensing devices 34, 36 and the current sensing device 38. Thus, even though the embodiments shown in FIGS. 1-3 show these signals/structures, it should be understood that the present invention also encompasses embodiments that lack one or more of these.

Additionally as shown in FIG. 1, the system 2 also includes, in the present embodiment, a controller 40 and optionally one or more input and/or output devices 42, for example, a computer monitor, a keyboard, a touch screen, a dip switch or other user-operated switch input device, a connection to the internet or another network, etc. In the present embodiment as shown, the controller 40, which can be a microprocessor-based controller or other control device, generates and provides the signals 22, 24 and 26 to govern the operation of the main switching device 18 (e.g., the contactor) and the additional switching device 20 (e.g., the SCR and the isolation contactor). Also, the controller 40 is configured to receive the first and second voltage sensing signals 28, 30 and the current sensing signal 32. As described in more detail with respect to FIGS. 6-8, in at least some embodiments, the controller 40 generates the control signals 22, 24 (and possibly 26) based directly or indirectly upon these signals 28, 30 and/or 32, as well as possibly based upon input signals received from exterior sources by way of the device(s) 42 or other information available to the controller. In some embodiments, the controller 40 and/or device(s) 42 can be considered to constitute part of the switching apparatus 4.

Figure 2:
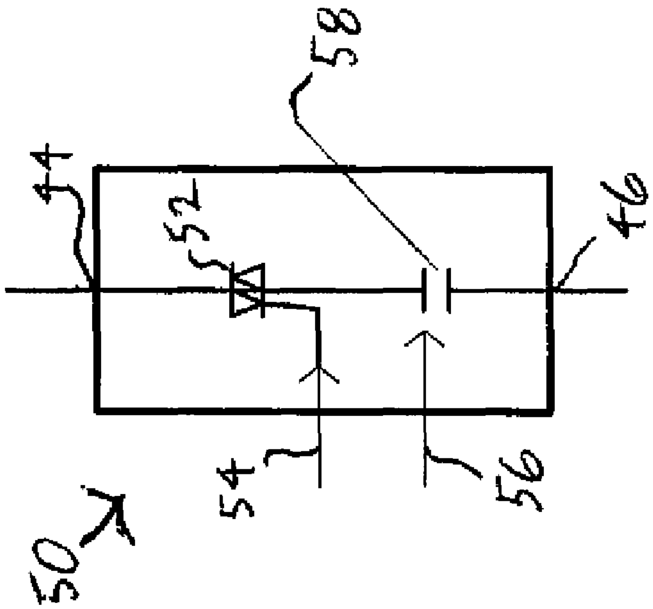
FIG. 2 shows in schematic form a first exemplary embodiment of the additional switching device of FIG. 1.

Turning to FIG. 2, one exemplary embodiment of the additional switching device 20 of FIG. 1 is shown to be an additional switching device 50. The device 50 includes a dual anti-parallel SCR 52 that is controlled or triggered by an SCR gate control signal 54 corresponding to the signal 24 of FIG. 1. The device 50 additionally includes an isolation contactor 58, coupled in series with the SCR 52 between first and second ports 44 and 46, respectively, the opening and closing of which is governed by an isolation contactor coil control signal 56 that corresponds to the signal 26 of FIG. 1. Again, although the embodiment of FIG. 2 shows the isolation contactor 58 and related signal 56, it should be understood that the isolation contactor and related signal are optional and that, in alternate embodiments of the additional switching device, the isolation contactor and related signal need not be present, such that the dual anti-parallel SCR device 52 would be coupled directly between first and second ports 44 and 46, respectively, of the additional switching device 50. The dual anti-parallel SCR 52 is configured to conduct from such a time as a triggering signal (e.g., a high-level or one value signal) is provided as the control signal 54, until such time as the triggering signal is no longer present (e.g., the signal has become a low-level or zero value signal) and the current passing through the SCR becomes zero, at which point the SCR ceases conducting.

Figure 3:
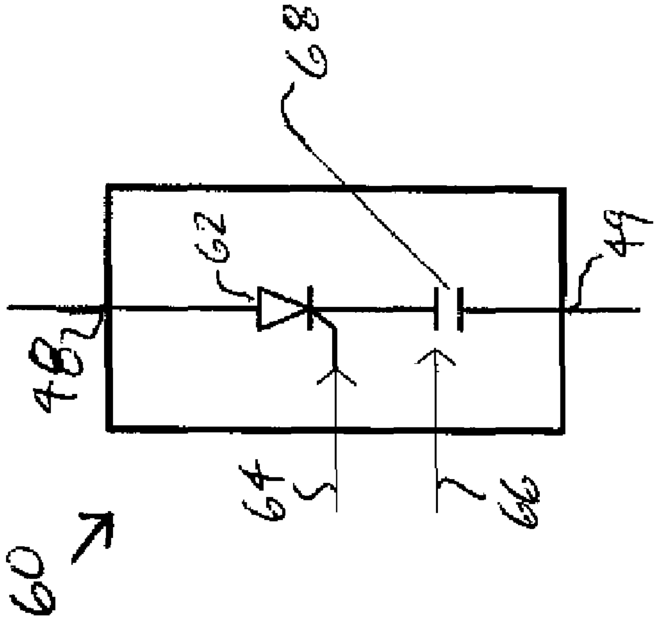
FIG. 3 shows in schematic form a second exemplary embodiment of the additional switching device of FIG. 1.

Turning to FIG. 3, the additional switching device 20 of FIG. 1 can also take another form, as an additional switching device 60. As shown, the device 60 includes a single SCR 62 coupled in series with an isolation contactor 68 between first and second ports 48 and 49, where the single SCR 62 is controlled by way of an SCR gate control signal 64 that corresponds to the signal 24 of FIG. 1 and the isolation contactor 68 is controlled by way of an isolation contactor coil control signal 66 corresponding to the signal 26 of FIG. 1. The isolation contactor 68, like the isolation contactor 58, is optional and, in alternate embodiments, the SCR 62 is directly coupled between the ports 48 and 49. The single SCR 62 in the present embodiment is configured to conduct current from the first port 48 to the second port 49 upon being triggered (e.g., provided with a high-level signal) until the current flowing through the SCR falls to zero (subsequent to the ending of the triggering). However, while the dual anti-parallel SCR 52 of FIG. 2 is capable of conducting current in either direction (e.g., either from port 44 to port 46 or vice-versa) upon the triggering of the signal 54, the single SCR 62 of FIG. 3 is only capable of conducting current from the port 48 to the port 49 upon being appropriately triggered by the signal 64. Thus, if the SCR 62 is triggered by the signal 64 at a time when current would tend to flow from the port 49 to the port 48, the device fails to conduct upon that triggering and immediately shuts off before ever conducting current.

The various embodiments of switching apparatuses 4 encompassed by the present invention, including the embodiments employing the additional switching devices 50, 60 of FIGS. 2 and 3, are capable of operating so as to provide improved switching operation in one or more manners. In embodiments where the switching apparatus 4 includes the main switching device 18 and one of the SCRs 52 and 62 (or another similar transistor device or solid state device), but neither one of the isolation contactors 58 and 68 or any of the voltage sensing or current sensing devices 34, 36 and 38, implementation of the apparatus 4 is advantageous insofar as it reduces the extent to which the main switching device 18 (e.g., contactor) is exposed during switching to sharp transitions in power and current and consequent arcing. More particularly, operation of such embodiments of the switching apparatus 4 reduces the stress upon the main switching device 18 by triggering the respective SCR 52 or 62 (or other similar device) prior to the closing of the main switching device as well as triggering the respective SCR prior to the opening of that main switching device. Thus, it is the SCR that bears the brunt of any sharp power or current transitions that occur, rather than the main switching device 18. Further, although the opening and closing of the main switching device 18 is controlled to occur at times when the SCR is conducting, the particular times at which the SCR is triggered are not closely controlled so as to occur at particular levels of voltage or current (or likely-to-occur values of current where current has not yet begun to flow) as experienced at the ports 10 and 14 of the switching apparatus 4.

In contrast, further embodiments of the switching apparatus 4 that do employ voltage and current sensing do (or can) take that information into account in controlling the opening and closing of the main switching device 18 and/or the triggering of the SCR 52 or 62. More particularly, in such embodiments, the SCRs 52, 62 are triggered to conduct at times in which it is expected that the current likely to flow through the SCR upon the closing of the SCR will be small and balanced. The appropriate times at which this should occur can be determined based upon the sensed voltage or current levels and also possibly based upon information regarding the devices 6 and 8 to which the apparatus 4 is coupled, particularly information regarding a load device (e.g., a load device 8). By properly timing the triggering of the SCRs so as to reduce the amount of initial current tending to flow through those devices, stresses upon current-receiving devices (e.g., a load device) can be reduced. Thus, in such embodiments, not only are stresses upon the main switching device 18 reduced by the use of the SCR, but also stresses upon a load are reduced given the timing of the triggering of the SCR.

As already noted above, various embodiments of the switching apparatus 4 need not include any additional isolation contactor such as the isolation contactors 58, 68 connected in series with the SCRs 52 and 62. Nevertheless, at least some embodiments do include such isolation contactors. The inclusion of the isolation contactors serves to guarantee proper isolation of the ports 10 and 14 in the event the SCRs 52, 62 for some reason fail to provide isolation when they are supposedly non-conductive. As will be described in further detail below, the isolation contactors must be controlled to be closed prior to such times as the SCRs are triggered to enter their conductive states, and the isolation contactors should only be opened after such times as the SCRs have entered their non-conducting states.

Figure 4:
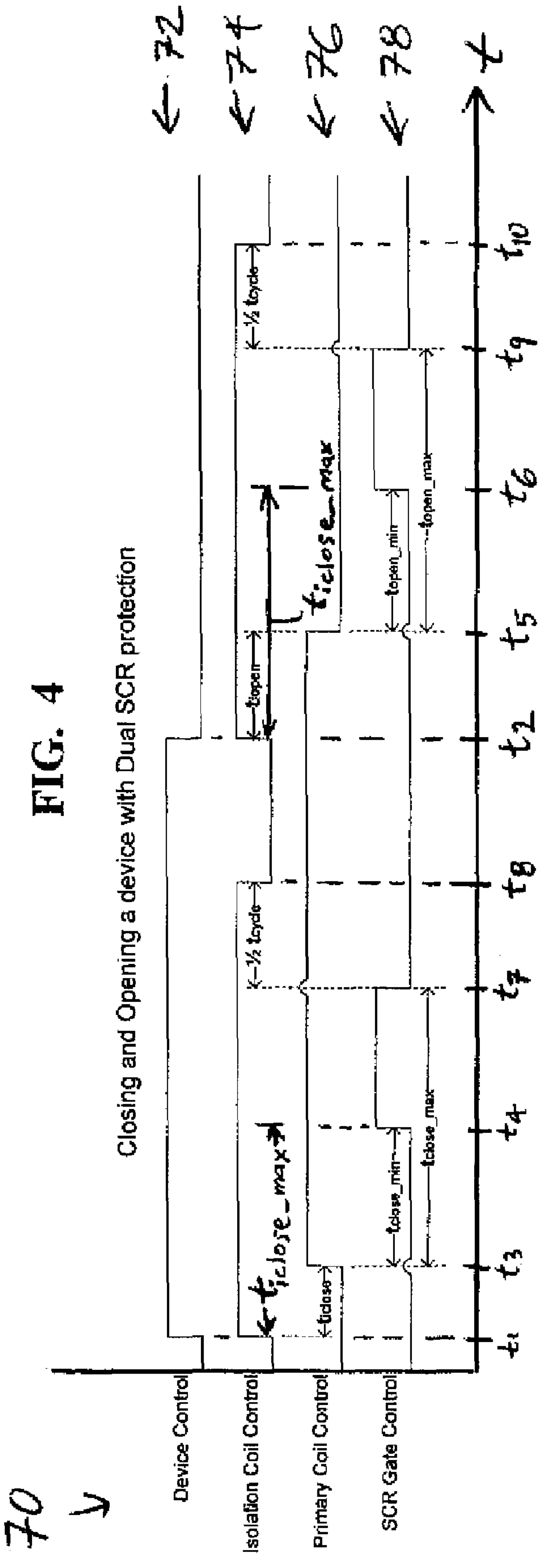
FIG. 4 is a timing diagram showing exemplary operation of the switching apparatus of FIG. 1 when employing the additional switching device of FIG. 2, in accordance with at least some embodiments of the present invention.

Turning to FIGS. 4-8, multiple timing diagrams are provided showing exemplary operation of several embodiments of the system 2, the switching apparatus 4 and the additional switching devices 50, 60 discussed above. Although these timing diagrams show several exemplary manners of operation, the present invention is also intended to encompass other particular manners of operation that are appropriate for various apparatuses having a contactor or other main switching device coupled in parallel with an additional switching device capable of operating as a bypass or secondary conduction path. Referring to FIG. 4 in particular, a first timing diagram 70 shows exemplary signals occurring within one embodiment of the switching apparatus 4 that employs the additional switching device 50 with the dual anti-parallel SCR 52 and the isolation contactor 58, but does not operate based upon any sensed voltage or current information (that is, in this embodiment the voltage and current sensing signals 28, 30, 32 and sensing devices 34, 36, 38 are not present). As shown in the timing diagram 70, a device control signal 72 is an input command signal provided to the controller 40 indicating commands to open or close the switching apparatus 4. These commands can be provided by way of the input/output device 42 or automatically determined by the controller 40 based on various other information.

More specifically, FIG. 4 shows that at a first time $t_1$ the device control signal 72 changes from a low value to a high value indicating a command that the switching apparatus proceed from being an open circuit to a closed circuit. Later, at a time $t_2$, the device control signal 72 changes from a high value to a low value indicating a command that the switching apparatus 4 change from being a closed circuit to being an open circuit. In addition to the device control signal 72, the first timing diagram 70 additionally shows an isolation contactor coil control signal 74, a primary contactor coil control signal 76 and a SCR gate control signal 78, which respectively correspond to the signals 26, 22, and 24 of FIG. 1 (with the signal 74 also corresponding to the signal 56 of FIG. 2 and the signal 78 corresponding to the signal 54 of FIG. 2). As discussed in further detail below, upon changes occurring in the device control signal 72 at, for example, the times $t_1$ and $t_2$ shown, the controller 40 causes changes in the other control signals 74, 76 and 78.

More particularly, upon the device control signal 72 switching at the time $t_1$ or the time $t_2$, the controller 40 immediately causes the isolation contactor coil control signal 74 to vary from a low value to a high value at those same times such that the isolation contactor 58 is caused to begin closing. Following these transitions at the times $t_1$ and $t_2$, the controller 40 then subsequently causes additional transitions in each of the signals 74, 76 and 78. These transitions are determined based upon several considerations. First, the closing or opening of the isolation contactor 58 is not instantaneous but rather can take up to a maximum amount of time, $t_{iclose\_max}$. Thus, it is necessary to delay the triggering of the SCR 52 and the closing or opening of the main switching device 18 at least until the isolation contactor 58 is guaranteed to be closed. Further, while the SCR 52 is capable of beginning to conduct essentially instantaneously upon receiving an appropriate trigger signal (e.g., the SCR gate control signal 54), the main switching device 18 is not typically capable of opening or closing instantaneously in response to a change in the primary contactor coil control signal 22. At the same time, it is also desirable that the main switching device 18 become closed at not too long of a time period subsequent to the triggering of the SCR 52, such that the SCR only needs to conduct current (often at above-rated levels) over a relatively short period of time to avoid overheating or other malfunction of the SCR.

In view of these considerations, when operating the switching apparatus 4 to achieve closure of the main switching device 18, the controller 40 delays the switching of the primary contactor coil control signal 76 from a low level to a high level until a time $t_3$ subsequent to the time $t_1$, and further delays the switching of the SCR gate control signal 78 from a low level to a high level until a time $t_4$ subsequent to the time $t_3$. Likewise, when the switching apparatus 4 is being operated to open the switching apparatus 4, the controller 40 delays the switching of the primary contactor coil control signal 76 from a high level to a low level until a time $t_5$ subsequent to the time $t_2$ at which the device control signal 72 changed values, and further delays the triggering of the SCR gate control signal (from a low level to a high level) until a time $t_6$ subsequent to the time $t_5$.

More particularly, during closing of the switching apparatus 4, the difference between the time $t_3$ at which the primary contactor coil control signal 76 changes and the time $t_1$ at which the initial change in the device control signal 72 occurs is a time $t_{iclose}$. This time is equal to the difference between the maximum time required to close the isolation contactor 58 subsequent to the changing of the isolation contactor coil control signal 74, $t_{iclose\_max}$, and a minimum pickup time that is required for the main switching device 18 to react to a switching of the primary contactor coil control signal 76, $t_{close\_min}$. That is, $t_{iclose}$ is equal to $t_{iclose\_max}$ minus $t_{close\_min}$, such that the switching of the primary contactor coil control signal 76 is delayed by a sufficient time amount that it would be impossible for the main switching device 18 to close prior to the closing of the isolation contactor 58. (It should further be noted that $t_{iclose}$ is equal to zero in cases where the isolation contactor 58 is guaranteed to respond faster to changes in the isolation contactor coil control signal 74 than the main switching device 18 responds to changes in the primary contactor coil control signal 76.) Similarly, when opening the switching apparatus 18, the time $t_5$ at which the primary contactor coil control signal 76 is switched from a high level to a low level intended to cause opening of the main switching device 18 is delayed relative to the switching of the isolation contactor coil control signal 74 to a high state at the time $t_2$ (tending to cause the isolation contactor 58 to close) by a time $t_{iopen}$ equaling the difference between the time $t_{iclose\_max}$ and a time $t_{open\_min}$, which is the minimum time required for the main switching device 18 to open in response to the switching of the primary contactor coil control signal 76.

Further, with respect to the time $t_4$ at which the SCR gate control signal 78 is caused to switch during closing of the switching apparatus 4, the controller 40 determines this time as occurring subsequent to the time $t_3$ by the time $t_{close\_min}$, which again is the minimum time after the triggering of the primary contactor coil control signal 76 at which it is possible that the main switching device 18 could possibly become closed. Also, since it is not guaranteed that the main switching device 18 will close at a particular time subsequent to the switching of the primary contactor coil control signal 76, but rather that it will only close within a range of times extending from the time $t_{close\_min}$ subsequent to the switching of the primary contactor coil control signal 76 to a later time $t_{close\_max}$ after the switching of the primary contactor coil control signal, the SCR gate control signal 78 is maintained at a high level from the time $t_4$ until a time $t_7$ (which is subsequent to $t_3$ by $t_{close\_max}$). Thus, it is guaranteed that the SCR 52 will be conducting at such time as the main switching device 18 becomes closed.

Likewise, with respect to the time $t_6$ at which the SCR gate control signal 78 is triggered during opening of the switching apparatus 4, this time occurs subsequent to the time $t_5$ by the time amount $t_{open\_min}$, which is the minimum time required for the main switching device 18 to respond to the switching of the primary contactor coil control signal 76 from the high level to the low level. The SCR gate control signal 78 is then maintained at the high level from the time $t_6$ until a time $t_9$ occurring subsequent to the time $t_5$ by a time $t_{open\_max}$, which represents the maximum time subsequent to the switching of the primary contactor coil control signal 76 that it can take the main switching device 18 to open. Thus, it is guaranteed that the SCR 52 is conducting at such time as the main switching device 18 is opened, such that the SCR 52 bears the burden associated with current changes occurring with the final opening of the switching apparatus 4. Additionally, subsequent to the switching off of the SCR gate control signal 78 at the times $t_7$ and $t_9$, the SCR 52 continues to conduct for as much as a half of a cycle of the received oscillating current (until the current becomes zero). Since as discussed above the isolation contactor 58 should only be open-circuited after the SCR 52 has stopped conducting, the isolation contactor coil control signal 74 is switched from its high level to its low level only after a half period of $t_{cycle}$ has passed subsequent to each of times $t_7$ and $t_9$, at times $t_8$ and $t_{10}$, respectively.

Figure 5:
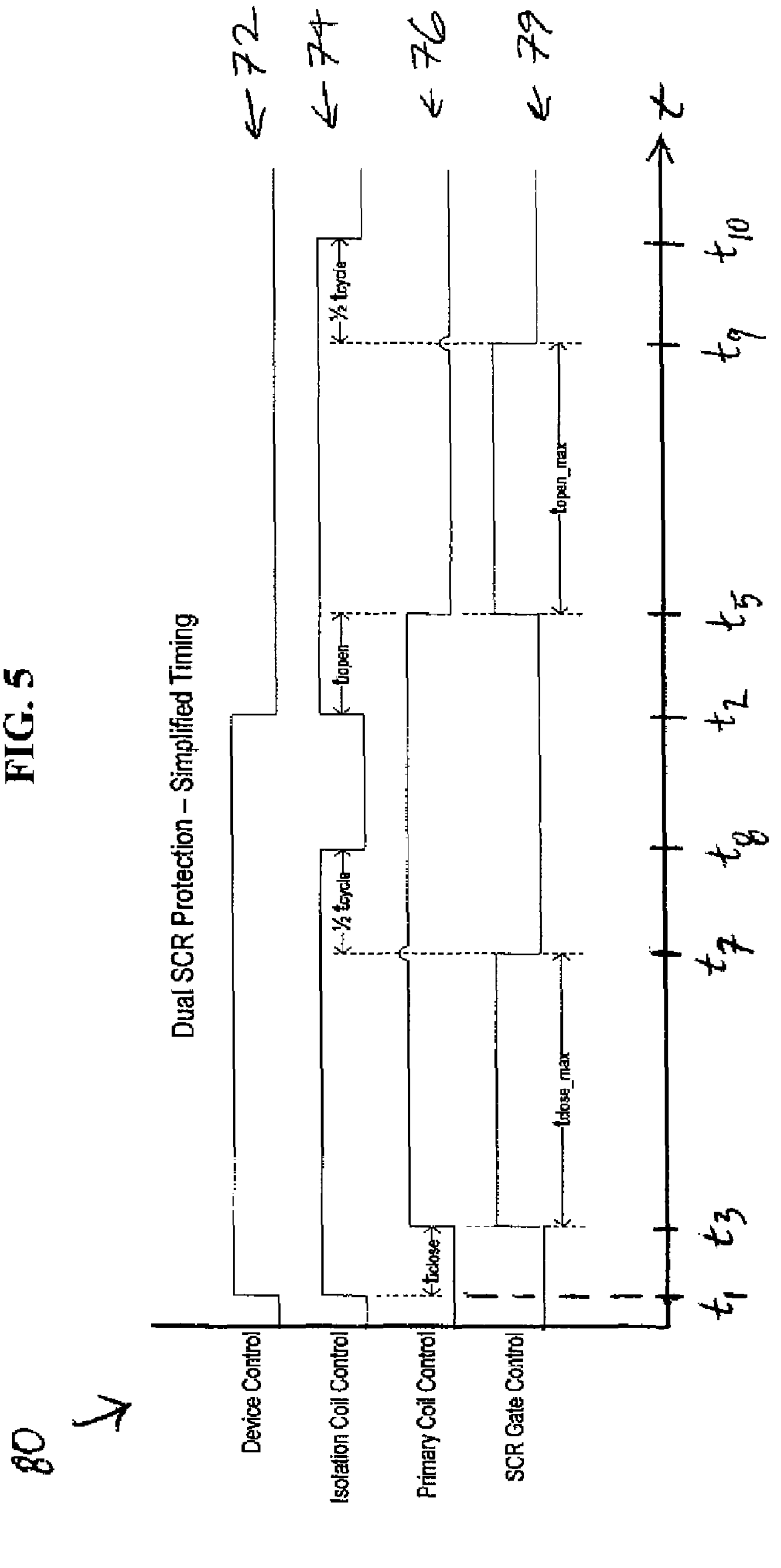
FIG. 5 is a timing diagram showing additional exemplary operation of the switching apparatus of FIG. 1 when employing the additional switching device of FIG. 2, in accordance with at least some embodiments of the present invention.

Turning to FIG. 5, a second timing diagram 80 is provided that shows an alternate version of the timing for an embodiment of the switching apparatus 4 in which the additional switching device 50 is employed, and which does not employ voltage or current sensing. In particular, in this alternate embodiment, while the device control signal 72, the isolation contactor coil control signal 74, and the primary contactor coil control signal 76 are all switched at the same respective times as shown in FIG. 4, a SCR gate control signal 79 (different from the SCR gate control signal 78 of FIG. 4) is switched on at the time $t_3$ rather than at the time $t_4$, and at the time $t_5$ rather than at the time $t_6$. Thus, in this embodiment, the SCR 52 is triggered to be conductive at earlier times relative to those shown in FIG. 4, and thus remains conductive for longer periods of time than in FIG. 4.

Figure 6:
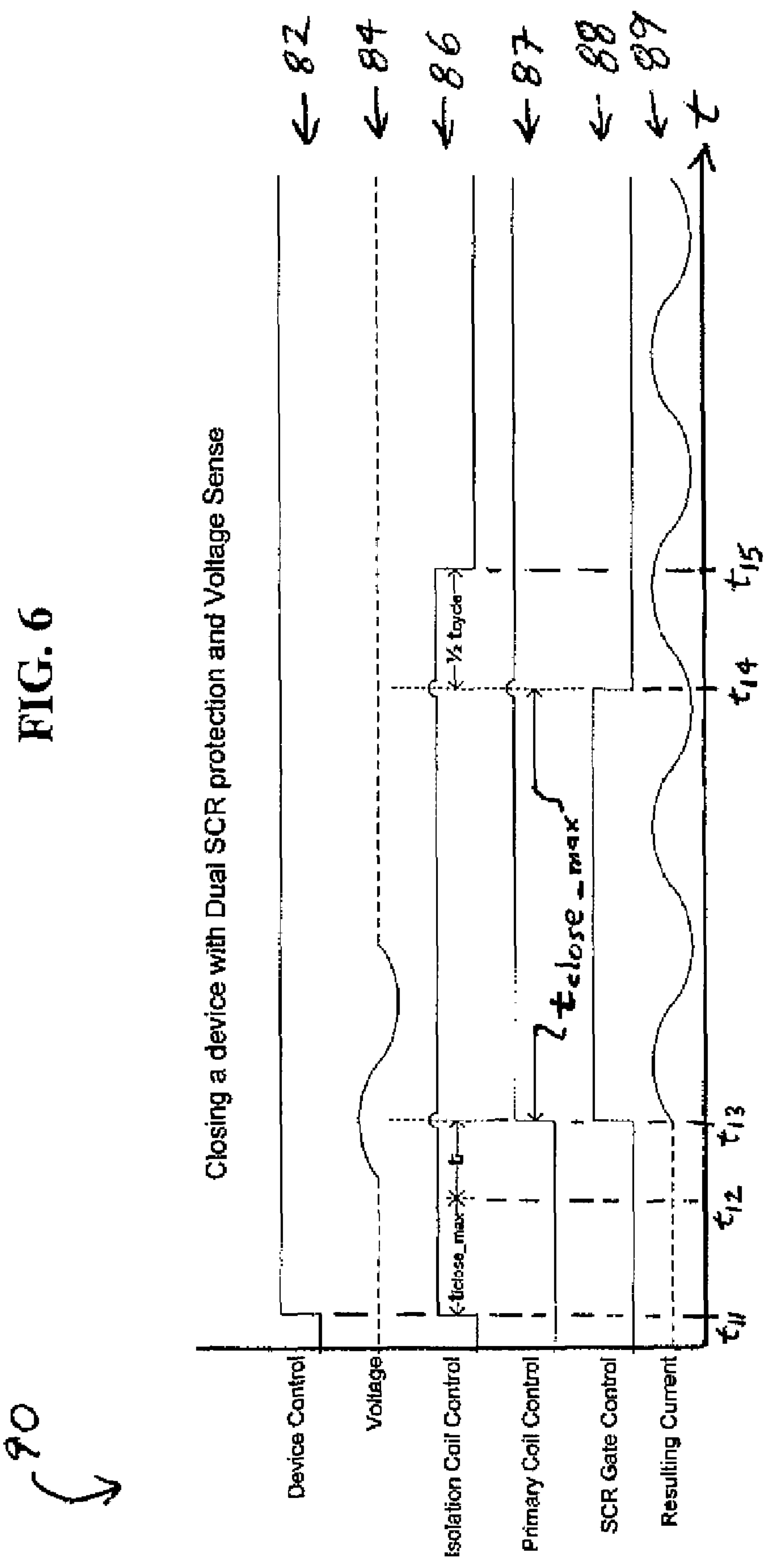
FIG. 6 is a timing diagram showing exemplary operation of the switching apparatus of FIG. 1 when employing the additional switching device of FIG. 2, where operation of the additional electrical switching device is controlled at least in part based upon a sensed voltage level, in accordance with at least some embodiments of the present invention.
Figure 7:
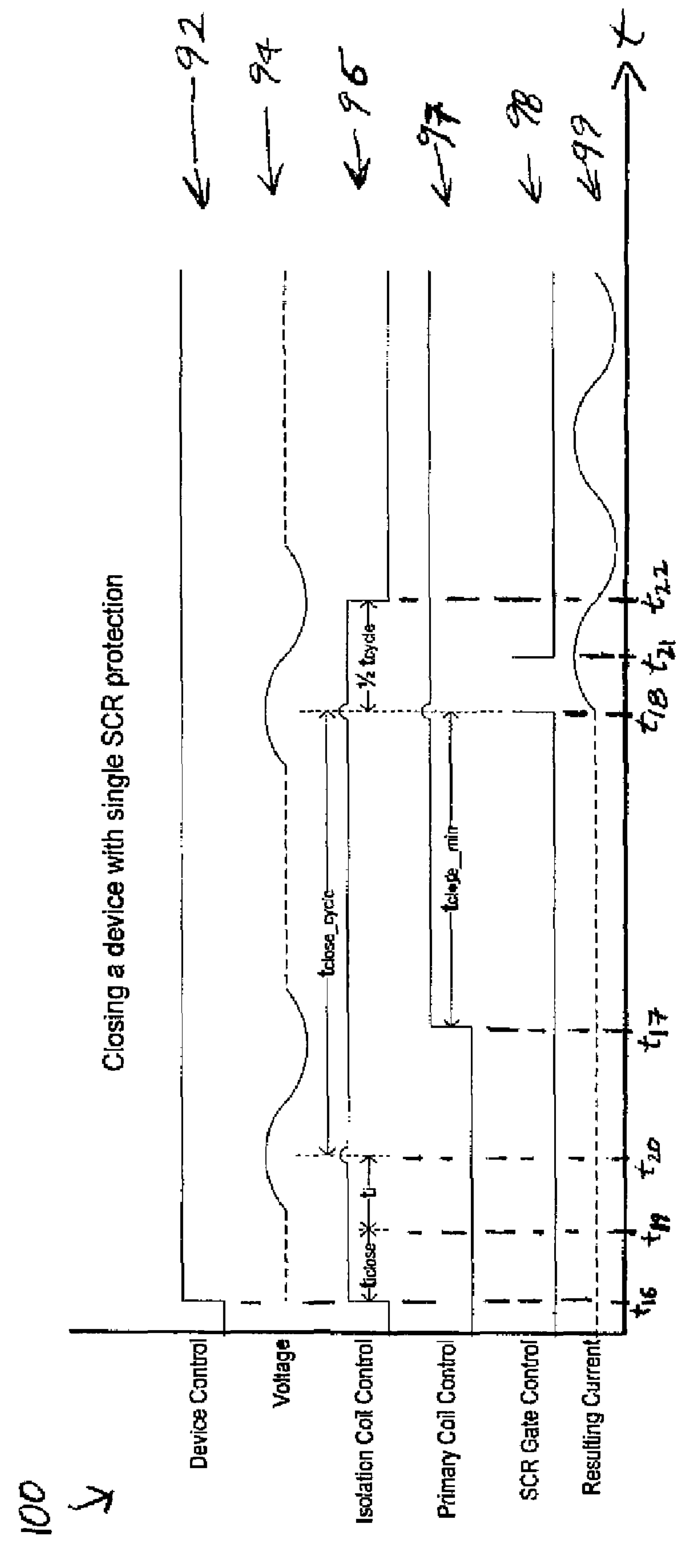
FIGS. 7 and 8, respectively, are timing diagrams showing exemplary operation of the switching apparatus of FIG. 1 when employing the additional switching device of FIG. 3, where operation of the additional switching device is controlled at least in part based upon a sensed voltage level and a sensed current level, respectively, in accordance with at least some embodiments of the present invention.
Figure 8:
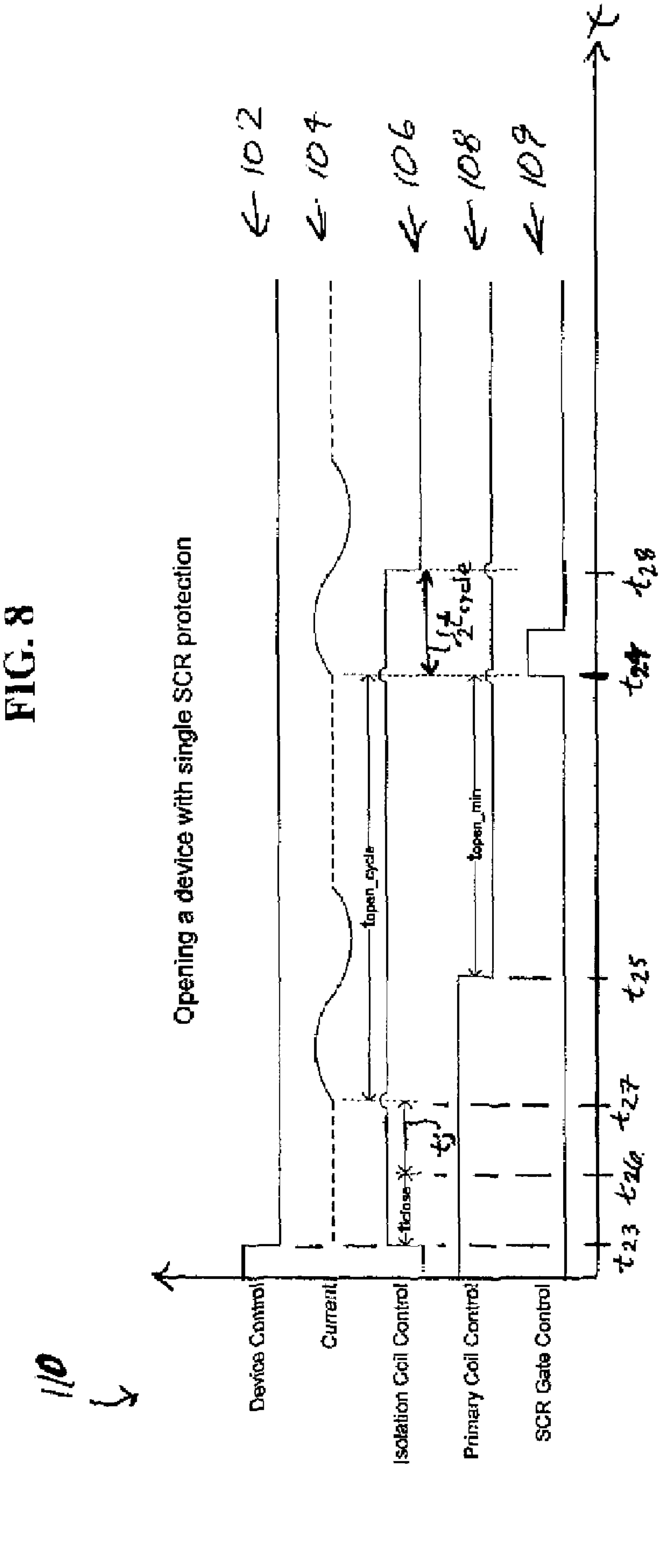

FIGS. 4 and 5 provide exemplary timing diagrams showing the operation of certain embodiments of the switching apparatus 4 in which the switching of the apparatus occurs without reference to any information regarding the voltages at the ports 10, 14 or the current flowing through (or likely to flow through) the switching apparatus. Because of this, the timing shown in these diagrams is most appropriate for embodiments of the switching apparatus 4 that employ an additional switching device capable of conducting in either direction, such as the additional switching device 50, but not embodiments that employ an additional switching device capable of conducting in only one direction such as the additional switching device 60. In contrast, FIGS. 6-8 provide timing diagrams showing exemplary operation of other embodiments of the switching device 4 in which the switching does occur based upon voltage-related and/or current-related information. Consequently, the timing shown in these timing diagrams is applicable to switching apparatuses with additional switching devices capable of bidirectional or unidirectional conduction, as discussed further below.

More particularly, referring to FIG. 6, a timing diagram 90 shows exemplary operation of one embodiment of the switching apparatus 4 that again employs the additional switching device 50 of FIG. 2, where the controller 40 bases operation of the switching apparatus upon sensed voltage (but not current) information, e.g., information provided by way of the voltage sensing devices 34, 36. As in the timing diagrams of FIGS. 4 and 5, the timing diagram 90 shows a device control signal 82 that is switched from a low value to a high value at a time $t_{11}$ indicating a request or command that the switching apparatus 4 be closed. Also, at the same time $t_{11}$, the controller 40 additionally causes an isolation contactor coil control signal 86 to switch from a low value to a high value so as to eventually cause the isolation contactor 58 to close. As previously discussed, it is known that the isolation contactor 58 will close at least within the time $t_{iclose\_max}$ subsequent to the time $t_{11}$, namely, at a time $t_{12}$. Once it is guaranteed that the isolation contactor 58 is closed at the time $t_{12}$, then the controller 40 monitors the voltage sensing signals 28 and 30 and derives from those signals a voltage signal 84 representing the difference between those signals. As the controller 40 monitors this information, it then further selects or otherwise determines a time at which effective closure of the switching apparatus 4 would likely result in small and balanced current flowing through switching apparatus. In an example shown in FIG. 6, this time, which is shown as a time $t_{13}$, occurs subsequent to the time $t_{12}$ by a time $t_i$.

At the time $t_{13}$, then, the controller 40 causes a SCR gate control signal 88 corresponding to the signal 54 of FIG. 2 and signal 24 of FIG. 1 to switch from a low level to a high level, thus triggering the dual anti-parallel SCR 52. As a consequence, the switching apparatus 4 becomes closed and conducts current by way of the SCR 52. A resulting current that begins to flow within the switching apparatus 4 through the SCR 52 upon the closure of the SCR, as represented by a resulting current signal 89, is initially at a zero level at the time $t_{13}$ when the SCR is closed (confirming that the controller 40 selected the appropriate time for switching the SCR). Additionally, at this time $t_{13}$, a primary contactor coil control signal 87 for controlling the main switching device (e.g., contactor) 18 is switched by the controller 40 from a low level to a high level. As a result, the main switching device 18 subsequently closes within a given time period known to the controller 40, namely, $t_{close\_max}$, subsequent to the time $t_{13}$. Once the main switching device 18 is guaranteed to be closed, the dual anti-parallel SCR 52 no longer needs to remain triggered and so the SCR gate control signal 88 returns from the high level to the low level at a time $t_{14}$ that is subsequent to the time $t_{13}$ by the time $t_{close\_max}$. Subsequent to the time $t_{14}$, the controller 40 then causes the isolation contactor coil control signal 86 to switch from the high level to the low level after the passage of a half cycle (½ $t_{cycle}$), at a time $t_{15}$. As was described with respect to FIG. 4, this delay in the transition of the isolation contactor coil control signal 86 is intended to assure that the isolation contactor 58 does not open until such time as the SCR 52 has ceased conducting.

While FIG. 6 shows timing that is appropriate for closing of the switching apparatus 4, the timing shown in either of FIGS. 4 and 5 is still appropriate for opening the switching apparatus 4. That is, the opening of the switching apparatus 4 when it employs the dual anti-parallel SCR 52 is not performed based upon any voltage or current sensing in the embodiment of FIG. 6. Nevertheless, the timing of FIG. 6 differs significantly in its effects relative to that of FIGS. 4 and 5. While in the embodiments of FIGS. 4 and 5 the main switching device 18 is protected by the SCR 52 from the negative effects of sudden changes in current during opening and closing of the switching apparatus 4, in the embodiment of FIG. 6 two types of protection are provided. First, the main switching device 18 is protected by the SCR 52 from the negative effects of sudden changes in currents upon the opening and closing of the switching apparatus 4, and second the appropriate timing of the closing of the SCR 52 further is capable of protecting an external device such as a load device (e.g., the device 8) from large inrushing currents.

Referring to FIGS. 7 and 8, additional timing diagrams 100 and 110 respectively show exemplary timing for closing and opening, respectively, an embodiment of the switching apparatus 4 that employs the additional switching device 60 having the single SCR 62 of FIG. 3. More particularly with respect to FIG. 7, closing of the switching apparatus 4 is based upon voltage information provided by way of the voltage sensing signals 28 and 30, as in the case of FIG. 6. The switching process again begins when a device control signal 92 switches from a low value to a high value, at a time $t_{16}$. At this time, an isolation contactor coil control signal 96 is then also immediately switched from a low value to a high level. Subsequent to the time $t_{16}$, a primary contactor coil control signal 97 is switched from a low value to a high value at a time $t_{17}$ and a SCR gate control signal 98 is switched to a high level from a low level at a time $t_{18}$ that is subsequent to the time $t_{17}$. The time $t_{18}$ occurs after the time $t_{16}$ by a total time equaling the sum of three components, namely, a first component $t_{iclose}$, a second component $t_i$, and a third component $t_{close\_cycle}$ (that is, $t_{18}$ minus $t_{16}$ is equal to $t_{iclose}$ plus $t_i$ plus $t_{close\_cycle}$). The time $t_{17}$ occurs in advance of the time $t_{18}$ by the time $t_{close\_min}$, which again (as discussed above) is the minimum time required subsequent to the transitioning of the primary contactor coil control signal 97 at the time $t_{17}$ for the main switching device 18 to become closed.

As described above with respect to FIGS. 4 and 5, the time $t_{iclose}$ is equal to the difference between a maximum amount of time that it can take for the isolation contactor (in this case, the isolation contactor 68) to close in response to the transition of the isolation contactor coil control signal 96, $t_{iclose\_max}$, and $t_{close\_min}$ (that is, $t_{iclose}$ equals $t_{iclose\_max}$ minus $t_{close\_min}$), and the time $t_{iclose}$ is equal to zero if the response of the isolation contactor 68 in response to the isolation contactor coil control signal is guaranteed to be faster than the response of the main switching device 18 to the switching of the primary contactor coil control signal 97. As shown in FIG. 7, the passage of the time $t_{iclose}$ following $t_{16}$ occurs at a time $t_{19}$. As for the time $t_i$, that is an additional time amount that separates the time $t_{19}$ from a time $t_{20}$ at which a desired voltage condition occurs in a voltage signal 94, which in the present embodiment is representative of the difference between the voltage sensing signals 28 and 30 of FIG. 1. The time $t_i$ typically is less than one period of the oscillating voltage signal 94. The desired voltage condition is typically a condition that, given known electrical properties of the system 2, would result in relatively small (or zero) inrush current through the switching apparatus 4 upon the switching apparatus becoming conductive. Although not necessarily the case in the embodiment of FIG. 6, in the present embodiment the voltage condition is also such that, if the additional switching device 60 was closed at the time $t_{20}$ so as to conduct current, the current would flow from the port 48 to the port 49 rather than in the opposite direction and thus would flow through the SCR 62 rather than being precluded from flowing through that device.

Although the time $t_{20}$ would be an appropriate time for the SCR 62 to close in order to minimize current flow, the SCR cannot yet be closed at this time due to the typically slow closure speed of the main switching device 18. Rather, the time $t_{18}$ at which the SCR 62 is triggered is delayed to occur subsequent to the time $t_{20}$ by the time $t_{close\_cycle}$, which is a period of time that is equal to an integral number of the cycles of the voltage signal 94, each of which has a period of time $t_{cycle}$, where the time $t_{close\_cycle}$ is larger than the time $t_{close\_min}$ but is not larger than a time $t_{close\_min}$ plus $t_{cycle}$. That is, the controller 40 determines $t_{close\_cycle}$ as being the smallest number of cycles that exceeds in length $t_{close\_min}$. Because the time $t_{18}$ is an even number of cycles subsequent to the time $t_{20}$, which was selected as a desirable time at which to start conducting current, the time $t_{18}$ also is a desirable time at which to start conducting. That is, when the SCR 62 is switched on at time $t_{18}$, the inrush current that initially flows through the SCR 62 and the isolation contactor 68 is small (and positively directed to flow from the port 48 to the port 49) and balanced, as shown in FIG. 7 by a resulting current signal 99. Further, upon determining $t_{close\text{-}cycle}$ and $t_{18}$, the controller 40 also then determines the time $t_{17}$ at which the primary contactor coil control signal 97 is to be switched, as the difference between $t_{18}$ and $t_{close\_min}$. It can be assumed in the present embodiment that a maximum amount of time required to close the main switching device 18 subsequent to the time $t_{17}$ does not exceed $t_{close\_min}$ by more than one-half of a cycle. Thus, the SCR 62 becomes conductive no more than ½ $t_{cycle}$ prior to the closure of the main switching device 18.

Further as shown in FIG. 7, the SCR gate control signal 98 switches back from its high level to its low level at a time $t_{21}$ subsequent to the time $t_{18}$, which is prior to a time $t_{22}$ that is a half of $t_{cycle}$ subsequent to time $t_{18}$. In the present embodiment, in which it is assumed that the minimum and maximum amounts of time required for the main switching device 18 to close differ by no more than one-half of a cycle, the SCR 62 need only be triggered briefly. This is because the SCR gate control signal 98 is triggered at a time of zero current, and so, the SCR 62 is guaranteed to conduct for a half-cycle between times $t_{21}$ and $t_{22}$. Further, because the SCR 62 becomes non-conductive at time $t_{22}$, the isolation contactor coil control signal 96 also can be switched to a low level at the time $t_{22}$. Subsequent to the time $t_{22}$, the main switching device 18 is conductive.

It should again be noted that the appropriate time $t_{18}$ for switching on the SCR 62, which is the time at which a small and balanced current is likely to flow, is determined based upon the voltage signal 94. Although FIG. 7 shows the time $t_{18}$ to coincide with a peak of the signal 94, this time need not always coincide with a peak of the voltage signal, a zero value of the voltage signal or a minimum of the voltage signal, but rather the appropriate time can depend upon the electrical characteristics of the devices 6, 8 to which the switching apparatus 4 is coupled or other factors. For example, the appropriate time can depend upon whether the device 8 is a load device that is purely resistive, purely reactive, or both resistive and reactive, as well as whether any reactance is inductive or capacitive. As mentioned above, this information can be specified to the controller 40 by an operator or potentially can be sensed or otherwise automatically determined by the controller (or programmed onto the controller). In at least some embodiments, the controller 40 operates to determine the appropriate time as a time at which a voltage is above or below a threshold, or at which an actual or expected current is below a threshold.

Turning to FIG. 8, when the controller 40 governing the switching apparatus 4 discussed with respect to FIG. 7 receives a command that the switching apparatus should open by way of a device control signal 102 (a continuation of the signal 92 of FIG. 7) at a time $t_{23}$, an isolation contactor coil control signal 106 (a continuation of the signal 96 of FIG. 7) is switched by the controller from a low value to a high value. Then, the controller 40 also determines a time $t_{24}$ at which an SCR gate control signal 109 (a continuation of the signal 98 of FIG. 7) switches from a low level to a high level, which is subsequent to the time $t_{23}$ by a time that is equal to the sum of $t_{iclose}$, $t_j$, and $t_{open\_cycle}$. The time $t_{iclose}$ is calculated as the difference between the time $t_{iclose\_max}$ (which is identical to that referred to with respect to FIG. 7) and a time $t_{open\_min}$, which is the minimum amount of time required by the main switching device 18 to respond to a switching of a primary contactor coil control signal 108 (a continuation of the signal 97) from high to low. The time $t_{open\_cycle}$ is a time corresponding to an integral number of cycles (each of which has a period $t_{cycle}$) that is larger in extent than the time $t_{open\_min}$ by no more than $t_{cycle}$. The time $t_j$, like the time $t_i$ of FIG. 7, is indicative of a time that is required to proceed from a time $t_{26}$, which occurs subsequent to the time $t_{23}$ by the time $t_{iclose}$, until a time $t_{27}$ at which a current flowing through the overall switching apparatus 4 is at (or is satisfactorily proximate to) zero, as indicated by a current signal 104 that corresponds to the current sensing signal 32 of FIG. 1. The time $t_j$ could be equal to the time $t_i$ of FIG. 7, although typically it will not be so, and can be determined based upon whether sensed current satisfies a threshold criterion. Since the time $t_{24}$ at which the SCR 62 is switched on occurs at an even number of cycles subsequent to the time $t_{27}$ (e.g., by $t_{open\_cycle}$), the time $t_{24}$ at which the SCR is switched on is a time at which the current flowing through the switching apparatus 4 again is zero (or sufficiently proximate to zero).

Upon the controller 40 determining the time $t_{24}$, the controller then is also capable of determining a time $t_{25}$ at which the primary control signal 108 switches from the high level to the low level, as $t_{24}$ minus $t_{open\_min}$, where $t_{open\_min}$ is the minimum amount of time that it would take for the main switching device 18 to switch off in response to the switching of the primary coil control signal 108. Once the time $t_{25}$ is determined by the controller 40, then the controller at that time is able to cause the primary contactor coil control signal 108 to switch off, and subsequently at the time $t_{24}$ is able to cause the SCR 62 to be triggered. Next, between the time $t_{24}$ and a time $t_{28}$ that is a half-cycle (½ $t_{cycle}$) after the time $t_{24}$, the main switching device 18 opens. Again, as in the case of FIG. 7, it is assumed that the difference between $t_{open\_min}$ and $t_{open\_max}$ (the maximum amount of time required for the main switching device to respond) is no more than ½ $t_{cycle}$. Finally, for the same reasons as were discussed with respect to FIG. 7, the SCR gate control signal 109 need not be triggered high for much time after the time $t_{24}$ (e.g., a quarter-cycle is typically sufficient), and the isolation contactor coil control signal 109 is switched off at the time $t_{28}$.

Although it is assumed, in relation to the above-described embodiments, that the switching apparatus 4 is used to govern the coupling of the pair of devices 6, 8 by way of a single overall link, the present invention is also intended to encompass other embodiments employing two or three or more such switching devices that can be used in three-phase or other multi-phase applications. For example, three of the switching apparatuses 4 can be implemented in a three-phase delta-configured embodiment having a delta-configured load, with no special features necessary for controlling the opening or closing of the three switching apparatuses. In a three-phase wye-configured embodiment having a three-phase wye-configured load with three overall switching apparatuses, it would be possible to employ two of the switching apparatuses 4 each having a main switching device 18 and an additional switching device 20, in combination with a third switching apparatus that did not have any additional switching device corresponding to the additional switching device 20. In such a configuration, the switching apparatus lacking the additional switching device/solid state protection would need to be closed before the others and also opened after the others were opened. Also, it should be noted that in such an embodiment, if one of the other two phases was shorted, then the third phase would be the one that would make and break load current. To avoid such a scenario, it would also be possible to provide solid state protection on all three phases and to make sure that one of the three phases was closed prior to the starting of the process of closing the others.

It is specifically intended that the present invention not be limited to the embodiments and illustrations contained herein, but include modified forms of those embodiments including portions of the embodiments and combinations of elements of different embodiments as come within the scope of the following claims.

We claim:

1. An apparatus comprising:

first and second ports;

a contactor coupled between the ports; and a switching device coupled in parallel with the contactor between the ports, wherein the switching device includes a solid-state semiconductor device, wherein the solid-state semiconductor device is operated to become conductive at a first time prior to a second time at which the contactor switches from a non-conductive state to a conductive state in response to a first state change of a contactor control signal which occurs prior to the first time, and the solid-state semiconductor device remains conductive up to a third time at which the solid-state semiconductor device becomes non-conductive, wherein the third time is subsequent to the second time, and wherein the solid-state semiconductor device is operated to again become conductive at a fourth time which is prior to a fifth time at which the contactor switches from a conductive state to a non-conductive state in response to a second state change of the contactor control signal which occurs between the third and the fourth times, wherein the solid-state semiconductor device remains conductive from the fourth time up to a sixth time at which the solid-state semiconductor device becomes non-conductive, and wherein the sixth time is subsequent to the fifth time.

2. The apparatus of claim 1, wherein the contactor is a high-power contactor.

3. The apparatus of claim 1, further comprising a control device that determines when the first and the second state changes of the contactor control signal are provided to a coil of the contactor that is configured to cause the contactor to switch between the conductive and non-conductive states, and that determines when a second signal is provided to the solid-state semiconductor device and is configured to cause the solid-state semiconductor device to become conductive.

4. The apparatus of claim 3, further comprising an isolation contactor coupled in series with the solid-state semiconductor device, wherein the control device further determines when a third signal is provided to an additional coil associated with the isolation contactor that is configured to cause the isolation contactor to switch between additional conductive and non-conductive states.

5. The apparatus of claim 1, wherein the solid-state semiconductor device includes a silicon controlled rectifier (SCR) device.

6. The apparatus of claim 5, wherein the SCR device is a dual anti-parallel SCR.

7. The apparatus of claim 5, wherein the SCR device is a single SCR.

8. The apparatus of claim 5, wherein the first time is a first time amount subsequent to a first occurrence of a first command signal indicating that the apparatus be switched, wherein the first time amount is based at least in part upon a minimum amount of time required for an actuation of the contactor to close, wherein the fourth time is a second time amount subsequent to a second occurrence of the first command signal indicating that the apparatus be switched; wherein the second occurrence of the first command signal occurs between the third and the fourth times, and wherein the second time amount is based at least in part upon a minimum amount of time required for an actuation of the contactor to open.

9. The apparatus of claim 8, wherein a first occurrence of a second command signal provided to the solid-state semiconductor device causing the solid-state semiconductor device to be conductive is provided from the first time up until the third time, wherein the third time occurs a third time amount subsequent to the first occurrence of the first command signal, wherein the third time amount is based at least in part upon a maximum amount of time required for the actuation of the contactor to close, wherein a second occurrence of the second command signal provided to the solid-state semiconductor device causing the solid-state semiconductor device to be conductive is provided from the fourth time up until the sixth time, and wherein the sixth time occurs a fourth time amount subsequent to the second occurrence of the first command signal, and wherein the fourth time amount is based at least in part upon a maximum amount of time required for the action of the contactor to open.

10. The apparatus of claim 5, further comprising a voltage sensing device capable of sensing a voltage associated with the apparatus.

11. The apparatus of claim 10, wherein the first time at which the SCR is operated to become conductive is determined based at least in part upon the sensed voltage, and wherein the first time is determined to be a time at which, upon the SCR becoming conductive, a balanced, 360 degree conduction cycle will occur.

12. The apparatus of claim 11, wherein the first time is determined based additionally upon information relating to an electrical characteristic of a load device to which the apparatus is coupled.

13. The apparatus of claim 5, further comprising a current sensing device capable of sensing a current flowing through the apparatus between the ports.

14. The apparatus of claim 13, wherein the first time at which the SCR is operated to become conductive is determined based at least in part upon the sensed current, and wherein the first time is determined to be a time at which the current flowing through the apparatus is less than a threshold level of current.

15. A system comprising the apparatus of claim 1, the system further including a load device coupled to the second port.

16. The system of claim 15, wherein the load device is a motor, and system further includes a source device coupled to the first port.

17. A three-phase system comprising the apparatus of claim 1, which is operated to govern power flow associated with a first phase of the three-phase system, and in addition comprising a second apparatus and a third apparatus respectively operated to govern respective power flows associated with second and third phases of the three-phase system, respectively.

18. An apparatus comprising:

first and second ports;

a contactor coupled between the ports; and a switching device coupled in parallel with the contactor between the ports, wherein the switching device includes a solid-state semiconductor device and an isolation device which is coupled in series with the solid-state semiconductor device, wherein the isolation device is operated to become conductive at a first time prior to a second time at which the solid-state semiconductor device is operated to become conductive, wherein the contactor switches from a non-conductive state to a conductive state at a third time subsequent to the second time in response to a first state change of a contactor control signal which occurs between the first and second times, wherein the solid-state semiconductor device remains conductive up to a fourth time subsequent to the third time, and wherein the isolation device becomes non-conductive at a fifth time which is subsequent to the fourth time at which the solid-state semiconductor device becomes non-conductive, further wherein the isolation device is operated to become conductive at a sixth time which is prior to a seventh time at which the solid-state semiconductor device is operated to become conductive, wherein the contactor switches from a conductive state to a non-conductive state at an eighth time subsequent to the seventh time in response to a second state change of the contactor control signal which occurs between the sixth and seventh times, wherein the solid-state semiconductor device remains conductive up to a ninth time subsequent to the eighth time, and wherein the isolation device becomes non-conductive at a tenth time which is subsequent to the ninth time at which the solid-state semiconductor device becomes non-conductive.

19. The apparatus of claim 18, wherein the second time is a first time amount subsequent to a first occurrence of a first command signal that the apparatus be switched, wherein the first time amount is based at least in part upon a minimum amount of time required for a closing of the contactor and a maximum amount of time required for a closing of the isolation device, wherein the seventh time is a second time amount subsequent to a second occurrence of the first command signal that the apparatus be switched, and wherein the second time amount is based at least in part upon a minimum amount of time required for an opening of the contactor and the maximum amount of time required for a closing of the isolation device.

20. The apparatus of claim 19, wherein a first occurrence of a second command signal provided to the solid-state semiconductor device causing the solid-state semiconductor device to be conductive is provided from the second time up until the fourth time, wherein the fourth time occurs a third time amount subsequent to the first occurrence of the first command signal, wherein the third time amount is based at least in part upon a maximum amount of time required for a closing of the contactor, wherein a second occurrence of the second command signal provided to the solid-state semiconductor device causing the solid-state semiconductor device to be conductive is provided from the seventh time up until the ninth time, and the ninth time occurs a fourth time amount subsequent to the second occurrence of the first command signal, and wherein the fourth time amount is based at least in part upon a maximum amount of time required for an opening of the contactor.

21. The apparatus of claim 18, further including a sensing device configured to sense an electrical quantity associated with the apparatus, wherein the electrical quantity is a voltage existing across the first and second ports, and wherein the second time and the seventh time are determined based at least in part upon the voltage as indicating that, upon the solid-state semiconductor device becoming conductive, a current below a balanced 360 degree conduction cycle will occur.

22. The apparatus of claim 21, wherein the second time and the seventh time are also determined based at least in part upon information regarding an electrical characteristic of a load to which the apparatus is coupled.

23. The apparatus of claim 22, wherein the second time and the seventh time are also determined based at least in part upon an additional signal provided by an operator.

24. The apparatus of claim 18, further including a sensing device configured to sense an electrical quantity associated with the apparatus, wherein the electrical quantity is a current flowing between the first and second ports, and wherein the seventh time is determined based at least in part upon the current as a time at which the current crosses zero.

25. The apparatus of claim 24, wherein the second time and the seventh time are determined also based at least in part upon at least one of information regarding an electrical characteristic of a load to which the apparatus is coupled, and an additional signal provided by an operator.

* * * * *